3,321,554
MODIFIED POLYMERS OF 1,2-EPOXYHYDROCARBONS AND PROCESS FOR THEIR MANUFACTURE
Johann Wolfgang Zimmermann and Edgar Fischer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 3, 1961, Ser. No. 146,058
Claims priority, application Germany, Oct. 4, 1960,
F 32,258
10 Claims. (Cl. 260—874)

The present invention relates to modified polymers of 1,2-epoxyhydrocarbons and to a process for their manufacture.

It is known to modify macromolecular substances by reacting them in suitable manner with polymerizable unsaturated compounds in the presence of free radical polymerization catalysts. Thus branched polymers, so-called graft polymers, can be obtained in which the polymeric branches are built from other monomer structures than the polymeric backbone chain.

The graft polymerization of monomers that can be readily polymerized under the action of free radical polymerization catalysts, as for example vinyl acetate, acrylic and methacrylic esters, on polymers of 1,2-epoxyhydrocarbons, for example polyalkylene glycols, as backbone polymer has already been described in the following patents of the Federal Republic of Germany: Nos. 1,077,430; 1,081,230; 1,084,917, and 1,080,304.

The products prepared in accordance with the processes of the aforesaid patents are true graft polymers, that is to say the lateral branches have a polymeric nature, too. As structural units for the lateral branches there are used such unsaturated compounds as can be readily homopolymerized.

It has already been proposed to graft polyolefins with unsaturated compounds which are not or practically not capable of polymerizing with themselves. By this process the properties of the backbone polymer containing an uninterrupted carbon-carbon chain can be strongly modified, for example the solubility can be improved.

It has now been found that modified polymers of 1,2-epoxyhydrocarbons can be prepared by reacting polymers of 1,2-epoxyhydrocarbons composed of n-fold plurality of structural units of the following formula

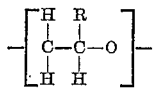

wherein R stands for a hydrogen atom or a monovalent radical of a saturated aliphatic hydrocarbon with 1 to 6 carbon atoms in a straight or branched chain, or a mononuclear aryl radical and $n$ is a whole number in the range from 10 to 50,000, and preferably 20 and 10,000 in the presence of free radical polymerization catalysts with at least one compound containing a single olefinic double bond which cannot be homopolymerized or can only be homopolymerized under the action of free radical polymerization catalysts to a product having an average molecular weight of at most 10,000.

By the process of the invention high molecular weight products are obtained which have an average molecular weight of at least 10,000.

Preferred polymers of 1,2-epoxyhydrocarbons, referred to in the following and in the claims as backbone polymers, are polymerization products of 1,2-alkylene oxides, for example polyethylene glycols having a molecular weight of 200 to 5,000,000, polypropylene glycols having a molecular weight of 200 to 10,000, polybutylene glycol, polystyrene oxide; furthermore copolymers of the basic monomers of the aforesaid polymers with one another with statistic distribution of the structural units or in the form of a block polymer, which can be composed, for example, of a polypropylene glycol center piece to which there have been added by polymerization on both terminal hydroxyl groups several mols of ethylene oxide.

The terminal groups of the polymers of 1,2-epoxyhydrocarbons consisting of one or two hydroxyalkylene groups, do not influence the process of the invention. Consequently there are suitable as polymers of 1,2-epoxyhydrocarbons quite generally also polyaddition compounds of 10 to 500 molecules of 1,2-alkylene oxide on organic compounds containing active hydrogen atoms, preferably 1 to 4 active hydrogen atoms, that is to say hydrogen atoms that are capable of additively combining 1,2-alkylene oxides under the known oxalkylation conditions. Organic compounds of this kind are, for example, carboxylic acids, alcohols and amines, or the following compound which is likewise qualified as backbone polymer

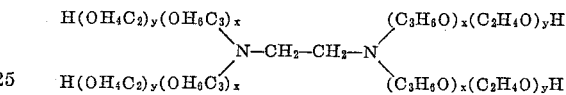

wherein $x$ represents a whole number in the range from 4 to 20 and $y$ represents a whole number in the range from 40 to 250.

Suitable olefinically unsaturated compounds which cannot or can only difficultly be polymerized alone under the action of free radical polymerization catalysts to high molecular weight products are, above all, the following compounds:

$\alpha,\beta$-Unsaturated dicarboxylic acids, the alkali metal salts thereof, preferably the sodium and potassium salts, the anhydrides thereof, the mono- and diesters thereof with saturated aliphatic alcohols having 1 to 18 carbon atoms in a straight or branched chain, for example the corresponding maleic acid or itaconic acid compounds. Moreover, there can be used crotonic acid, the alkali metal salts thereof, preferably the sodium or potassium salt, esters of crotonic acid and saturated aliphatic alcohols having 1 to 18 carbon atoms in a straight or branched chain, croton aldehyde; vinylsulfone compounds of the general formulae $RSO_2CH=CH_2$ and

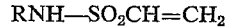

wherein R stands for a mono-, bi- or trinuclear, substituted or unsubstituted aromatic radical or a monovalent radical of a saturated aliphatic hydrocarbon having 1 to 18 carbon atoms in a straight or branched chain. R may represent a phenyl, dialkyl-aminophenyl, arylsulfonic acid, nonylphenyl nitroaryl, or oxaryl radical.

Still further, there are mentioned as olefinically unsaturated compounds esters of monohydric saturated aliphatic alcohols having 1 to 18 carbon atoms in a straight or branched chain and vinylsulfonic acid, vinylphosphonic acid, propenephosphonic acid or cinnamic acid. Further suitable compounds are alkali metal salts of cinnamic acid, especially the sodium and potassium salt, allyl-alkyl ethers having a saturated, straight-chain or branched alkyl radical having 1 to 18 carbon atoms, which may be halogen-substituted, preferably chlorine-substituted, dihydropyrane, allyl alcohol esters of saturated monocarboxylic acids with 1 to 3 carbon atoms, allyl amine, alkyl-vinyl ethers with a saturated straight chain or branched alkyl radical having 1 to 18 carbon atoms, which may be halogen-substituted and preferably chloro-substituted.

The reactants, i.e. the polymer or polymers, on the one hand, and the unsaturated compound or compounds that cannot or can only difficultly be homopolymerized, on the other, are used in a weight proportion of 100 to 1 to 1 to 100 and preferably up to 100 to 100.

As free radical polymerization catalysts there are used the common polymerization catalysts, preferably those which are soluble in an organic medium, for example dibenzoyl peroxide, diacetyl peroxide, di-tert-butyl peroxide, diisopropyl percarbonate, azobisisobutyronitrile.

Redox systems, for example dibenzoyl peroxide/benzoine or potassium presulfate/sodium metabisulfite, are likewise suitable.

The free radical polymerization catalysts are used in an amount of 0.1 to 15% by weight, calculated on the mixture of backbone polymer or polymers and unsaturated compound or compounds.

Depending on the catalyst or catalyst system used the reaction is carried out at a temperature in the range from 30 to 150° C., suitably in an inert atmosphere, for example nitrogen. It is of advantage to work in a homogeneous phase, that is to say a solution of the unsaturated compound in the melt of the polymer used.

The reaction mixture can be diluted by adding a solvent. In some cases the presence of an additional solvent may be necessary, for example when using as backbone polymer a polyethylene glycol, the melt of which has an especially high viscosity. The solvents used must be inert, i.e. they must not interact substantially with the radicals formed in the reaction mixture. There are suitable, for example, low molecular weight alcohols having 1 to 4 carbon atoms and esters of saturated aliphatic monocarboxylic acids having 1 to 3 carbon atoms and monohydric saturated aliphatic alcohols having 1 to 4 carbon atoms, benzene, chlorobenzene or acetone.

A batch may contain 5 to 90%, calculated on the total weight of the batch, of such a solvent.

The time of reaction can be varied within wide limits and it depends, above all, on the reactants and the catalyst used in each case. In general the reaction is conducted for 0.5 to 10 hours.

The reaction products are obtained as a melt solidifying in the form of a wax, as a liquid or as a solution. For many applications the reaction product need not be worked up.

Melts are allowed to solidify, for example on sheet metal or rolls, and then comminuted. Solutions can be concentrated by evaporation of the solvent or solvents when the product shall be further used in solid form.

It is relatively easy to prove that in the process of the invention a chemical reaction takes place leading to new chemically modified polymers of 1,2-epoxyhydrocarbons.

The properties of the new modified polymers of 1,2-epoxyhydrocarbons are absolutely different from those of, for example, a mixture of the backbone polymer with the olefinically unsaturated compound used. Especially the solubilities are entirely different so that from the crude product of the process of the invention excess amounts of unreacted unsaturated compound, which may be present, can be removed by extracting or repeatedly repre-cipitating the crude product, for example with diethyl ether from a methanolic solution.

By elementary analyses and by analyzing the oxethyl content according to P. W. Morgan, Ind. Eng. Chem. 18 (1946), 500, the degree of conversion can be determined in the modified polymers of 1,2-epoxyhydrocarbons thus purified.

When a water-soluble backbone polymer, for example polyethylene glycol, is reacted with a hydrophobic unsaturated compound, for example maleic acid dialkyl ester, it is easy to prove that a chemical modification has taken place. With an increasing incorporation of the hydrophobic compound there changes the hydrophilic-lipophilic equilibrium of the product the aqueous solution of which exhibits a characteristic cloud point on heating. The temperature of the cloud point is the lower the greater the proportion of hydrophobic compound grafted on. The occurrence of the cloud point proves at least qualitatively that a chemical modification of the backbone polymer has taken place.

In contrast thereto turbid solutions are obtained, independent of the temperature, when mixtures of the initial reactants are introduced into water, and from the turbid solutions in water the hydrophobic component separates.

The reaction of the invention probably takes place according to the following scheme of formulae, but this theoretical representation is not intended to limit the scope of the present invention

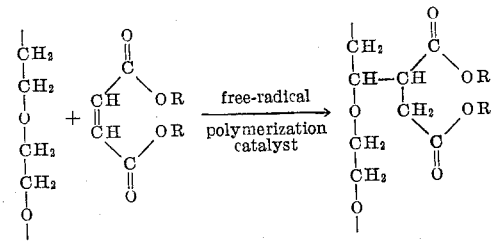

The reaction of the invention is therefore designated as "radical initiated substitution/addition."

The process of the invention yields novel substances which are very interesting from an industrial point of view, especially with respect to their surface active properties. They differ from graft polymers obtained by grafting with readily polymerizable monomers in that the lateral branches grafted on the main chain are preferably monomolecular, or have a short chain length only, corresponding to the low tendency of the monomers used to polymerize.

The process of the invention thus permits the manufacture of a novel type of modified polymers of 1,2-epoxyhydrocarbons in which the properties of solubility, for example, can be varied in a wide range as desired by selecting suitable lateral branches. It was surprising and could not be expected that under the aforesaid conditions compounds which are difficult to polymerize or cannot be polymerized at all can be substitutionally added with good yields and under the action of free radical polymerization catalysts on 1,2-epoxyhydrocarbon polymers.

Many examples for both components are recited above. In the final product the proportion by weight of the compounds ranges from 100 to 1 to 1 to 100, and preferably 100:1 to 100:100.

In the following there are mentioned by way of example some characteristic types of compounds obtained by the process of the invention:

(1) Polyethylene glycol modified with one or more maleic acid dialkyl esters yields a non-ionic emulsifier in which the hydrophilic:lipophilic proportion can be varied in the molecule as desired:

(a) By the molecular weight of the polyethylene glycol used, (b) By the size of the alkyl radical of the ester component, and (c) By the amount of ester component used.

High molecular weight non-ionic emulsifiers of this type cannot be prepared in the usual manner by oxethyl-ating long chain hydrophobic organic compounds.

(2) Polyethylene glycol modified with maleic acid monoalkyl esters possess the remarkable property simultaneously to act as non-ionic and as anion-active emulsifier.

(3) Polyethylene glycol modified with a mixture of maleic acid dialkyl ester and p- or m-dimethylamino-phenylvinylsulfone is an emulsifier which simultaneously acts as non-ionic and as cation-active emulsifier.

(4) Polypropylene glycol modified with maleic acid monoalkyl ester becomes water-soluble or emulsifiable after neutralization with alkali.

The products of the present invention are especially suitable, for example, as textile auxiliaries and in the field of detergents.

The following examples serve to illustrate the invention, but they are not intended to limit it thereto, the parts and the percentages being by weight unless otherwise stated. The apparatus used in the examples consisted of a reaction vessel heated on a water bath and provided with stirrer, reflux condenser, dropping funnel, thermometer and nitrogen inlet tube.

Example 1

100 parts of polyethylene glycol, molecular weight 25,000, 20 parts of maleic acid dibutyl ester, and 2 parts of dibenzoyl peroxide were stirred for 4 hours at 80° C. The melt was then allowed to solidify on a metal sheet.

The product obtained yielded a clear solution in cold water. A mixture of polyethylene glycol and maleic acid dibutyl ester was not entirely soluble in water, the ester separated.

Analytical data of the graft polymer: content of oxethyl groups, 85.4%; saponification number 67 mg. KOH/g. A 1% aqueous solution of the product had a cloud point of 75° C. and a surface tension of 34 dynes/cm. A corresponding solution of polyethylene glycol having a molecular weight of 25,000 had a surface tension of 50 dynes/cm.

Example 2

200 parts of polyethylene glycol, molecular weight 4,000, 100 parts of maleic acid mono-2-ethylhexyl ester, and 6 parts of dibenzoyl peroxide were stirred for 3 hours at 80° C. The melt was diluted with methanol and the reaction product precipitated with diethyl ether in order to remove excess maleic acid monoester.

The product yielded a clear solution in water at pH 3.2 showing no cloud point on heating.

Analytical data: content of oxethyl groups, 74.7%. A 1% solution in water had a surface tension of 35 dynes/cm. at pH 3.2 and 31 dynes/cm. at pH 7.

Example 3

100 parts of polyethylene glycol, molecular weight 25,000, 70 parts of vinylphosphonic acid dibutyl ester, and 4 parts of azobisisobutyronitrile were stirred for 4 hours at 90° C. The melt was allowed to solidify on a metal sheet and then pulverized. The product was exhaustively extracted with diethyl ether. It yielded a clear solution in water.

Analytical data: content of oxethyl groups, 61.8%; content of phosphorus, 4.6%. A 1% aqueous solution of the product had a cloud point of 95° C. and a surface tension of 31 dynes/cm.

Example 4

100 parts of polyethylene glycol $\alpha,\omega$-dimethyl ether, molecular weight 20,000, 30 parts of phenylvinylsulfone, and 3 parts of dibenzoyl peroxide were stirred for 4 hours at 90° C. The melt, solidified on a metal sheet, yielded a clear solution in water. Pure phenylvinylsulfone was insoluble in water or an aqueous solution of polyethylene glycol dimethyl ether.

Analytical data: content of oxethyl groups, 72.3%; content of sulfur, 4.3%. A 1% aqueous solution of the product had a cloud point of 75° C. and a surface tension of 38 dynes/cm.

Example 5

500 parts of polyethylene glycol $\alpha,\omega$-dimethyl ether, molecular weight 25,000, 50 parts of dihydropyrane, and 1 part of dibenzoyl peroxide were stirred for 3 hours at 85° C. At the beginning of the reaction the polyethylene glycol melt and the dihydropyrane formed two layers, after about 90 minutes the reaction mixture became homogeneous and clear. In order to remove unreacted dihydropyrane or by-products the crude product was passed at 85° C. and under a pressure of 0.5 mm. of mercury through a thin-layer evaporator.

The modified polyethylene glycol yielded a clear solution in water.

Analytical data: content of oxethyl groups, 94.2%; content of hydroxyl groups, 0.3%.

Example 6

100 parts of polypropylene glycol, molecular weight 4,000, 3 parts of dibenzoyl peroxide, and 70 parts of p-aminophenyl-vinylsulfone were stirred for 3 hours at 80° C. under a blanket of nitrogen. The crude product was dissolved in 2 N hydrochloric acid, the insoluble constituents were separated and the modified polypropylene glycol was precipitated with aqueous ammonia solution.

Analytical data: nitrogen content, 3.1%; sulfur content, 6.2%.

Example 7

200 parts of polyethylene glycol, molecular weight 2,000, 5 parts of dibenzoyl peroxide, and 50 parts of maleic acid dioctadecyl ester were stirred for 4 hours at 85° C. under a blanket of nitrogen. The melt was allowed to solidify on a metal sheet, comminuted and extracted with diethyl ether.

Analytical data: content of oxethyl groups, 87.9%; saponification number, 23 mg. KOH/g.

Example 8

300 parts of polyethylene glycol, molecular weight 4,000, 11 parts of azobisisobutyronitrile, and 30 parts of vinylsulfone anilide were melted and stirred for 3 hours at 85° C. under a blanket of nitrogen. The light yellow melt was poured on to metal sheets and allowed to solidify. The product obtained yielded a clear solution in water. Vinylsulfone anilide is insoluble in water but soluble in dilute sodium hydroxide solution. Since the aqueous solution of the modified polyethylene glycol was entirely clear, the whole amount of vinylsulfone anilide must have reacted. When vinylsulfone anilide was added to the solution of the reaction product, the solution became turbid.

Analytical data: content of nitrogen, 0.63%; content of sulfur, 1.49%; content of oxethyl, 90.2%. A 1% aqueous solution had a surface tension of 35.2 dynes/cm.

Example 9

A mixture of polyethylene glycol, molecular weight about 2,000,000, 40 parts of maleic acid dibutyl ester, 4 parts of dibenzoyl peroxide, and 400 parts of chlorobenzene was stirred for 4 hours at 90° C. under a blanket of nitrogen. n-Hexane was then added to the solution of the reaction product while stirring, whereby the modified polyethylene glycol was precipitated. After having filtered and dried at 40° C. under a pressure of 30 mm. of mercury, a product was obtained which yielded a clear solution in water.

Analytical data: content of oxethyl, 84.5%; saponification number, 69 mg. KOH/g. A 1% solution in water had a cloud point of 67° C. and a surface tension of 38 dynes/cm.

Example 10

200 parts of polyethylene glycol, molecular weight 25,000, 100 parts of vinyl-$\beta$-chloroethyl ether, and 6 parts of dibenzoyl peroxide were homogeneously melted and stirred for 3 hours at 90° C. Excess vinyl-$\beta$-chloroethyl ether was removed from the melt in a thin-layer evaporator at 90° C. and under a pressure of 2 mm. of mercury, and the melt was allowed to solidify on metal sheets. The product obtained was soluble in water and contained 5.4% of chlorine.

Example 11

500 parts of a polyethylene glycol $\alpha,\omega$-dimethyl ether, molecular weight about 4,000, and 6 parts of dibenzoyl peroxide were melted at 90° C. while stirring. A solution of 25 parts of maleic anhydride in 50 parts of benzene was dropped into the melt. The mixture was stirred for 3 hours at 90° C. and the benzene and volatile by-products were removed in a thin-layer evaporator at 90° C. and under a pressure of 2 mm. of mercury.

The brownish product gave a clear solution in water. Analytical data: content of oxethyl, 96%; saponification number, 46. The 1,2-epoxyhydrocarbon polymer modified with maleic anhydride could be readily reacted with hydroxyl compounds or amines whereby the carboxylic anhydride lateral chain of the product was transformed into a semi-ester or semi-amide group (cf. Example 2).

*Example 12*

200 parts of a nitrogen-containing oxethylated polypropylene glycol of the following constitution

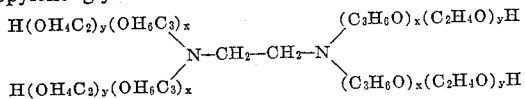

$x$=about 5, $y$=about 216, 40 parts of maleic acid dibutyl ester, and 4 parts of dibenzoyl peroxide were stirred for 4 hours at 80° C. and the melt obtained was allowed to solidify on a metal sheet. The product gave a clear solution in cold water. A 1% solution of the product in water had a cloud point of 56° C. and a surface tension of 31 dynes/cm. The product had a saponification number of 71.

We claim:

1. A process for the manufacture of chemically modified polymers of 1,2-epoxyhydrocarbons, said polymers having improved surface active properties, which process comprises reacting, at a temperature of from 30° C. to 150° C. and in the presence of 0.1 to 15 percent, by weight of the reaction mixture, of a free radical polymerization catalyst, (A) a polymer comprising 10 to 50000 polymer units derived from a polymerizable monomer of the formula

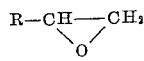

wherein R is hydrogen, a monovalent saturated hydrocarbon having 1 to 6 carbon atoms, and phenyl, and (B) at least one monomer selected from (1) alpha-beta-unsaturated dicarboxylic acids, their alkali metal salts, their anhydrides, and their mono- and di-esters with monohydric saturated alcohols having 1 to 18 carbon atoms; (2) vinyl sulfonic acid and its esters with monohydric saturated alcohols having 1 to 18 carbon atoms; (3) vinyl phosphonic acid and its esters with monohydric saturated alcohols having 1 to 18 carbon atoms; (4) vinyl sulfones of the formula $RSO_2CH=CH_2$ and $RNH-SO_2CH=CH_2$, wherein R is an aromatic radical having one to three nuclei or a saturated aliphatic hydrocarbon having 1 to 18 carbon atoms; (5) dihydropyran; and (6) allyl-alkyl and allyl-chloroalkyl ethers having 1 to 18 carbon atoms in the alkyl group thereof; the ratio by weight of reactant (A) to reactant (B) being from 100:1 to 1:100.

2. A process as in claim 1 wherein said monomer (B) is a vinyl sulfone.

3. A process as in claim 1 wherein polymer (A) is a polyethylene glycol having a molecular weight from 200 to 5,000,000.

4. A process as in claim 1 wherein polymer (A) is a polypropylene glycol having a molecular weight from 200 to 10,000.

5. A process as in claim 1 wherein monomer (B) is an allyl-alkyl ether.

6. A process as in claim 1 wherein said polymer (A) and monomer (B) are reacted in homogeneous phase in the presence of 5 to 90 percent, by weight of reaction mixture, of a solvent inert to free radicals liberated in the reaction mixture.

7. A chemically modified polymer of a 1,2-epoxyhydrocarbon prepared according to the process of claim 1.

8. A chemically modified polymer of a 1,2-epoxyhydrocarbon prepared according to the process of claim 2.

9. A process for the manufacture of chemically modified polyethylene glycol having improved surface active properties which comprises reacting (A) polyethylene glycol having a molecular weight in the range from 200 to 5,000,000 with (B) a diester of an $\alpha,\beta$-unsaturated dicarboxylic acid with a monohydric saturated aliphatic alcohol having 1-18 carbon atoms, in the presence of 0.1 to 15 percent by weight, calculated on the reaction mixture, of a free radical polymerization catalyst, at a temperature in the range from 30° to 150° C., the weight proportion of reactant (A) to reactant (B) being in the range from 100:1 to 1:100.

10. A chemically modified polymer of a 1,2-epoxyhydrocarbon prepared according to the process of claim 9.

References Cited by the Examiner

UNITED STATES PATENTS 2,837,496  6/1958  Vandenberg _____ 260—874
2,999,056  9/1961  Tanner _____ 260—874
3,033,841  5/1962  Germain _____ 260—29.6

FOREIGN PATENTS 1,111,394  7/1961  Germany.

MURRAY TILLMAN, *Primary Examiner.*

LEON J. BERCOVITZ, GEORGE F. LESMES,
D. J. BREZNER, E. M. WOODBERRY, N. W. SHUST,
*Assistant Examiners.*